US012567908B2

(12) United States Patent　　　　　(10) Patent No.:　US 12,567,908 B2
Naganuma et al.　　　　　　　　　　　(45) Date of Patent:　　Mar. 3, 2026

| | | | | |
|---|---|---|---|---|
| (54) | OPTICAL RECEIVER | | | |
| (71) | Applicant: | Fujitsu Limited, Kawasaki (JP) | | |
| (72) | Inventors: | Tomohiro Naganuma, Kawasaki (JP); Shoichi Murakami, Kawasaki (JP) | | |
| (73) | Assignee: | Fujitsu Limited, Kawasaki (JP) | | |
| ( * ) | Notice: | Subject to any disclaimer, the term of this patent is extended or adjusted under 35 U.S.C. 154(b) by 294 days. | | |
| (21) | Appl. No.: | 18/459,486 | | |
| (22) | Filed: | Sep. 1, 2023 | | |

(65) Prior Publication Data

US 2024/0113789 A1　　Apr. 4, 2024

(30) Foreign Application Priority Data

Sep. 29, 2022　(JP) ................................. 2022-156612

(51) Int. Cl.
　*H04B 10/60*　　　　　(2013.01)
(52) U.S. Cl.
　CPC .................................... *H04B 10/60* (2013.01)
(58) Field of Classification Search
　None
　See application file for complete search history.

(56) References Cited

U.S. PATENT DOCUMENTS

| | | | | |
|---|---|---|---|---|
| 5,490,179 A | * | 2/1996 | Ong | ........................... H04L 1/20 375/345 |
| 5,760,939 A | * | 6/1998 | Nagarajan | .......... H04B 10/6911 398/140 |

| | | | | |
|---|---|---|---|---|
| 2011/0241778 A1 | | 10/2011 | Chujo et al. | |
| 2015/0333864 A1 | * | 11/2015 | Swinkels | ........... H04B 10/0795 398/79 |
| 2017/0048018 A1 | * | 2/2017 | Swinkels | ............ H04J 14/0241 |
| 2020/0106543 A1 | * | 4/2020 | Jiang | ................... H04J 14/0305 |
| 2024/0113789 A1 | * | 4/2024 | Naganuma | ......... H04B 10/6931 |
| 2025/0247156 A1 | * | 7/2025 | Frankel | ................ H04B 10/071 |

FOREIGN PATENT DOCUMENTS

| | | |
|---|---|---|
| JP | 2011-217321 | 10/2011 |
| JP | 2013-090128 | 5/2013 |
| JP | 2013-150154 | 8/2013 |
| JP | 2015-146515 | 8/2015 |
| JP | 2015146515 A  * | 8/2015 |

OTHER PUBLICATIONS

Aschei, Laura et al., "A 42-GHz TIA in 28-nm CMOS With Less Than 1.8% THD for Optical Coherent Receivers", IEEE Solid-State Circuits Letters, vol. 3, pp. 238-241, Jul. 29, 2020.

Japanese Office Action mailed Jan. 27, 2026 for corresponding Japanese Patent Application No. 2022-156612, with English Translation, 8 pages.

* cited by examiner

*Primary Examiner* — Tanya T Motsinger
(74) *Attorney, Agent, or Firm* — Fujitsu Intellectual Property Center

(57)　　　　　　　ABSTRACT

An optical receiver includes a converter that converts an optical signal into an electrical data signal, a controller that changes an adjustment value of peaking based on a baud rate of the optical signal, and an amplifier that changes a band characteristic of the converter based on the adjustment value changed by the controller.

7 Claims, 11 Drawing Sheets

SI OPTICAL TRANSMISSION SYSTEM

L1:BAND CHARACTERISTIC OF MAIN SIGNAL
L2:BAND CHARACTERISTIC OF ADC
L3:BAND CHARACTERISTIC OF ICR
L4:BAND CHARACTERISTIC OF OPTICAL
RECEIVER (COMBINED BAND CHARACTERISTIC
OF ADC AND ICR)

L3-H: BAND CHARACTERISTIC OF ICR
(HIGH BAUD RATE)
L3-M: BAND CHARACTERISTIC OF ICR
(MEDIUM BAUD RATE)
L3-L: BAND CHARACTERISTIC OF ICR
(LOW BAUD RATE)

L1-H:BAND CHARACTERISTIC OF MAIN SIGNAL
(HIGH BAUD RATE)
L1-L:BAND CHARACTERISTIC OF MAIN SIGNAL
(LOW BAUD RATE)
L4:BAND CHARACTERISTIC OF OPTICAL RECEIVER

OPTICAL RECEIVER

CROSS-REFERENCE TO RELATED APPLICATION

This application is based upon and claims the benefit of priority of the prior Japanese Patent Application No. 2022-156612 filed on Sep. 29, 2022, the entire contents of which are incorporated herein by reference.

FIELD

A certain aspect of the embodiments is related to an optical receiver.

BACKGROUND

It is known that a transimpedance amplifier is incorporated in an optical receiver used in a digital coherent optical transceiver. Further, in an IMDD transmission system which is not a digital coherent transmission system, a technique for peaking a frequency characteristic using an analog circuit technique is known as a technique for coping with loss of a high-frequency signal propagating through an internal high-frequency line composed of a printed circuit board and electric connectors in an optical transceiver (see Japanese Laid-open Patent Publication No. 2015-146515).

In addition, a transimpedance amplifier having a core circuit having a frequency peaking control function is known (see Japanese Laid-open Patent Publication No. 2013-090128). Various techniques relating to peaking are known (see Japanese Laid-open Patent Publications No. 2011-217321 and No. 2013-150154).

SUMMARY

According to an aspect of the present disclosure, there is provided an optical receiver including a converter that converts an optical signal into an electrical data signal, a controller that changes an adjustment value of peaking based on a baud rate of the optical signal, and an amplifier that changes a band characteristic of the converter based on the adjustment value changed by the controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
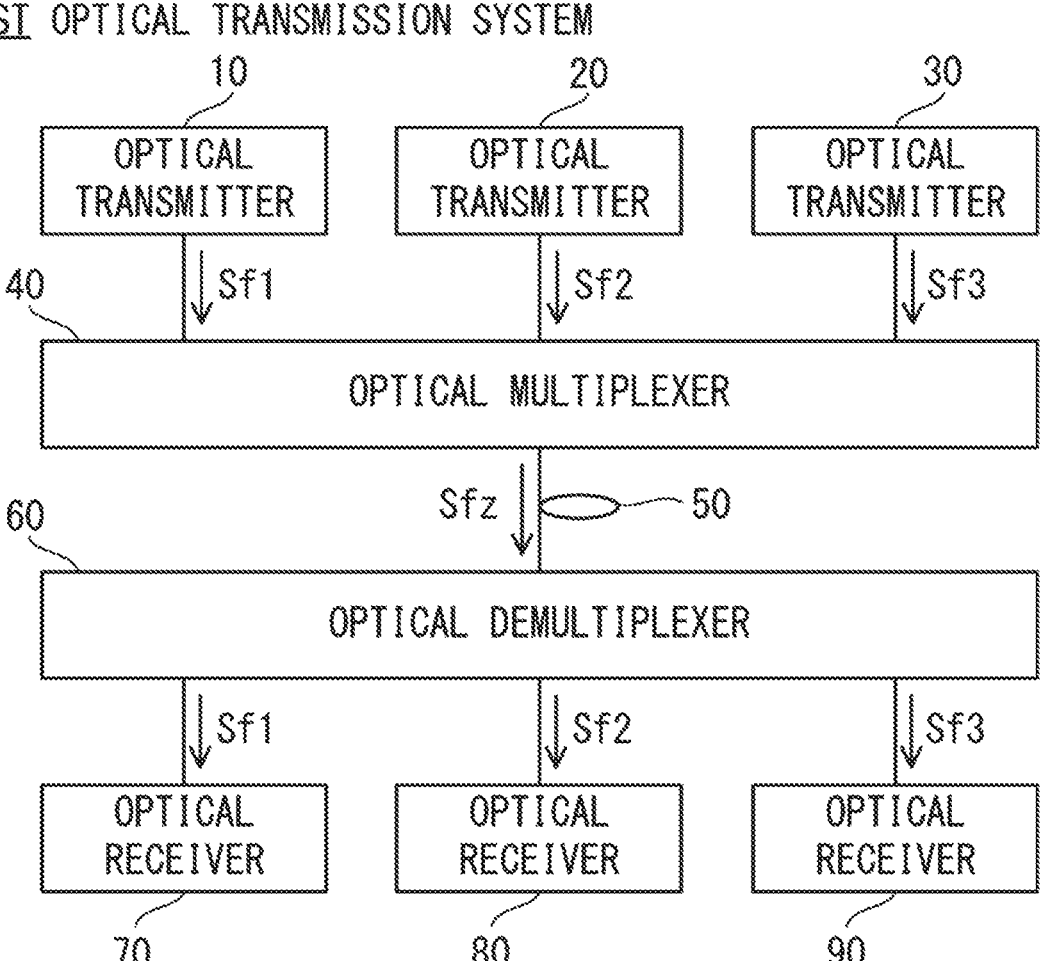
FIG. 1A is an example of an optical transmission system.

In an optical receiver, research has been conducted to receive an optical signal having a higher baud rate by utilizing peaking. For example, research has been conducted on receiving an optical signal at a high baud rate such as around 130 Gbaud (gigabaud) exceeding a range of a medium baud rate such as 96 Gbaud from a low baud rate such as 64 Gbaud.

However, when the baud rate is increased, the frequency utilization efficiency may be lowered. Further, when the baud rate is increased, an amount of band narrowing received in a ROADM (Reconfigurable Optical Add/Drop Multiplexer) provided in the middle of the optical transmission path may increase.

From such a viewpoint, it is preferable to realize an optical receiver capable of responding to a wide range of baud rates capable of not only receiving the optical signal at the high baud rate but also receiving the optical signal in the range from the low baud rate to the medium baud rate.

Here, if the band characteristic of the optical receiver is fixedly set to a band characteristic capable of receiving the optical signal of the low baud rate, for example, the band characteristic of the optical signal of the high baud rate is distorted by the set band characteristic, and the transmission performance may be deteriorated. Therefore, it is assumed that the band characteristic of the optical receiver is fixedly set to a band characteristic capable of receiving the optical signal of the high baud rate. Thus, the optical signal in the range from the low baud rate to the high baud rate can be received without distortion.

However, when the optical signal of the low baud rate is received in a state where the band characteristic of the optical receiver is fixedly set to the band characteristic capable of receiving the optical signal of the high baud rate, the following problem occurs. That is, in the wavelength division multiplexing transmission, the signal component of another optical signal adjacent to the optical signal exists in a region between the set band characteristic and the optical signal of the low baud rate. Since this signal component reduces the amplification factor of an amplifier such as a TIA (Transient Amplifier) provided in the optical receiver, the signal quality of the optical signal may deteriorate. As described above, when the band characteristic of the optical receiver is fixedly set to the band characteristic capable of receiving the optical signal of the high baud rate, the optical signal is not distorted in the wavelength division multiplexing transmission using the optical signal of the low baud rate, but the transmission performance may be deteriorated by the signal component of the adjacent optical signal.

It is an object of the present disclosure to provide an optical receiver that ensures a band characteristic corresponding to a baud rate of an optical signal.

Hereinafter, an embodiment for carrying out the present disclosure will be described with reference to the drawings.

First Embodiment

As illustrated in FIG. 1A, an optical transmission system ST includes a plurality of optical transmitters 10, 20 and 30, and a plurality of optical receivers 70, 80 and 90. Each of the optical transmitters 10, 20 and 30 is optically connected to an optical multiplexer (specifically, a multiplexer) 40. Each of the optical receivers 70, 80 and 90 is optically connected to an optical demultiplexer (specifically, demultiplexer) 60. The optical multiplexer 40 and the optical demultiplexer 60 are connected through an optical transmission path 50. The optical transmission path 50 includes, for example, an optical fiber.

The optical transmitters 10, 20 and 30 transmit main signals having center frequencies different from each other. In the present embodiment, the main signal is described as an example of an optical signal, but a control signal for controlling the optical transmitters 10, 20 and 30 or the optical receivers 70, 80 and 90 may be employed instead of the main signal. For example, the optical transmitter 20 transmits a main signal Sf2 having a center frequency f2. Since the optical transmitters 10 and 30 are basically the same as the optical transmitter 20, a detailed description thereof is omitted.

Figure 1B:
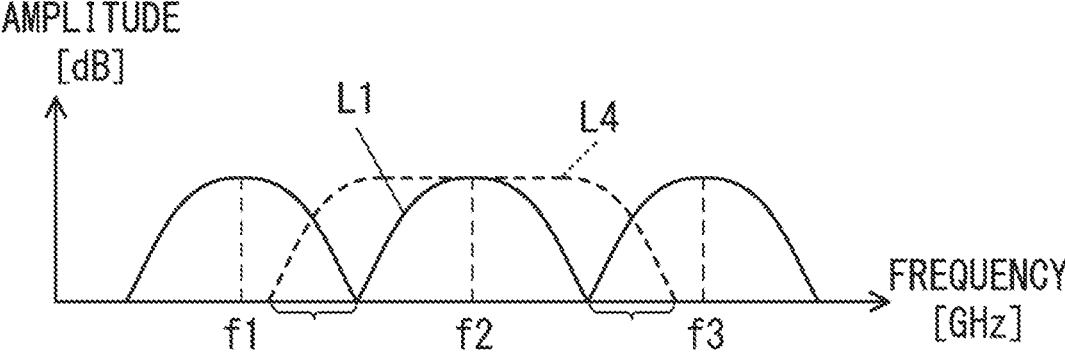
FIG. 1B is a diagram for explaining an example of band characteristic of a WDM (Wavelength Division Multiplexing) signal and band characteristic of an optical receiver.

The optical multiplexer 40 multiplexes the main signals Sf1, Sf2, and Sf3 respectively transmitted from the optical transmitters 10, 20 and 30 to generate a WDM signal Sfz. Thus, the optical multiplexer 40 transmits the WDM signal Sfz to the optical transmission path 50. When the optical multiplexer 40 multiplexes the main signals Sf1, Sf2, and Sf3, the optical multiplexer 40 arranges the adjacent main signals Sf1 and Sf2 and the adjacent main signals Sf2 and Sf3 so as to narrow the intervals between the adjacent main signals Sf1 and Sf2 and between the adjacent main signals Sf2 and Sf3, and generates the WDM signal Sfz, as illustrated in FIG. 1B. Thus, the utilization efficiency of the frequency can be improved.

The optical demultiplexer 60 receives the WDM signal Sfz passed through the optical transmission path 50. The optical demultiplexer 60 demultiplexes the WDM signal Sfz into main signals Sf1, Sf2, and Sf3. The optical demultiplexer 60 transmits, for example, the main signal Sf2 to the optical receiver 80. Thus, the optical receiver 80 receives the main signal Sf2. Since the optical receivers 70 and 90 are basically the same as the optical receiver 80, a detailed description thereof is omitted.

Here, as illustrated in FIG. 1B, the band characteristic L4 of the optical receiver 80 is sufficiently secured with respect to the band characteristic L1 of the main signal Sf2 transmitted from the optical transmitter 20. Thereby, the shape of the band characteristic L1 of the main signal Sf2 is not distorted due to the band characteristic L4 of the optical receiver 80. As a result, deterioration of the signal quality of the main signal Sf2 can be suppressed.

However, since the band characteristic L4 is excessively wide with respect to the band characteristic L1, when the main signal Sf2 is received, the optical receiver 80 also receives signal components A-L and A-H which are parts of other main signals Sf1 and Sf3 adjacent to the main signal Sf2, along with the reception of the main signal Sf2.

As will be described in detail later, the optical receiver 80 includes the TIA as an amplifier, and when the optical receiver 80 receives the signal components A-L and A-H, the amplification factor of the TIA may decrease due to the signal components A-L and A-H. Thereby, the signal quality of the main signal Sf2 is deteriorated, and as a result, the transmission performance of the optical transmission system ST may be deteriorated.

In order to suppress such a decrease in transmission performance, it is desirable to make the shape of the band characteristic L4 of the optical receiver 80 close to the shape of the band characteristic L1 of the main signal Sf2 to suppress reception of the signal components A-L and A-H. In the details will be described later, in the present embodiment, the shape of the band characteristic L4 is adaptively adjusted by utilizing peaking to approach the shape of the band characteristic L1. Thereby, even if the shape of the band characteristic L1 changes according to the baud rate of the main signal Sf2, the band characteristic L4 having a shape close to the shape of the band characteristic L1 can be secured.

The optical receiver 80 will be described in detail with reference to FIG. 2. Since the optical receivers 70 and 90 basically has the same configuration as that of the optical receiver 80, a detailed description thereof is omitted.

Figure 2:
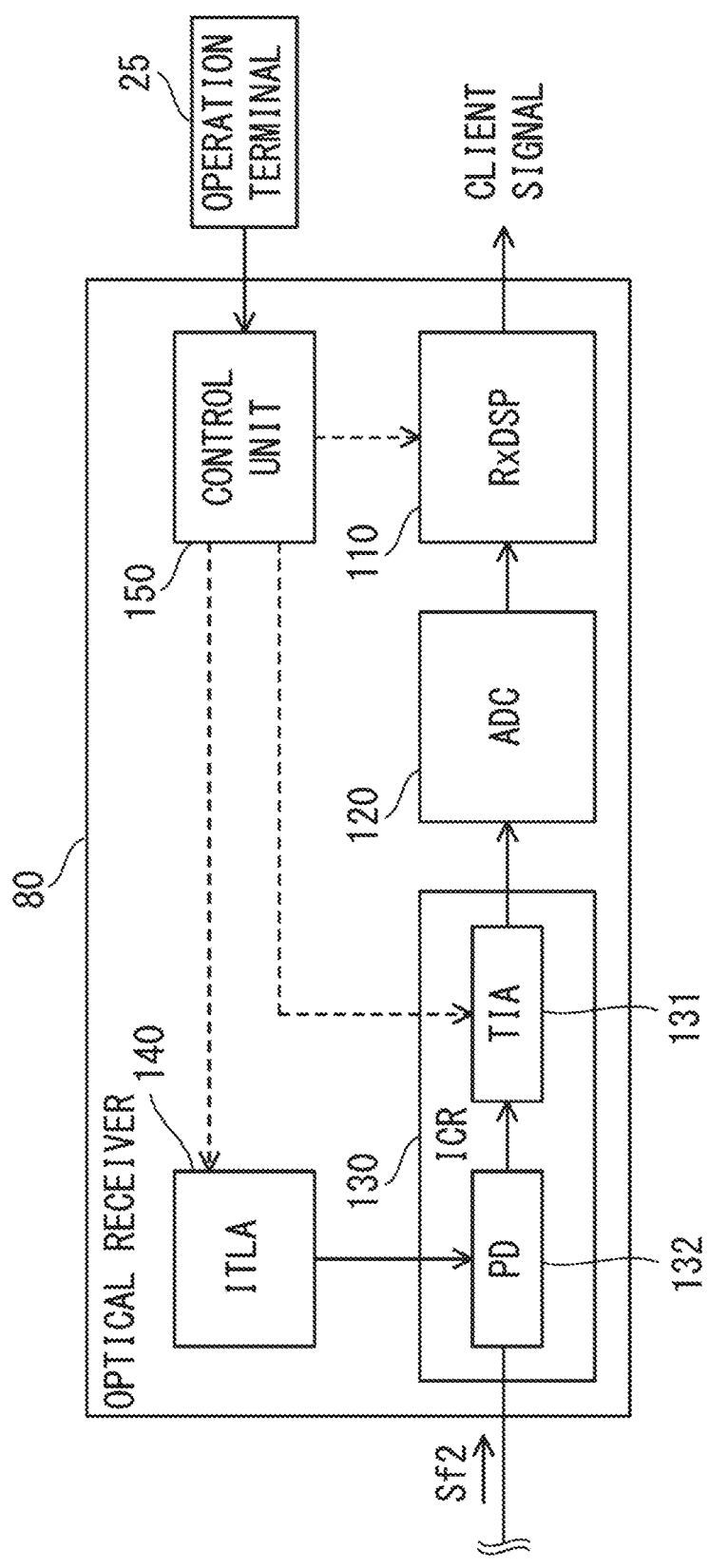
FIG. 2 is a block diagram illustrating an example of the optical receiver.

As illustrated in FIG. 2, the optical receiver 80 includes a receiving DSP (Digital Signal Processor, hereinafter referred to as RxDSP) 110 and an ADC (Analog Digital Converter) 120. The optical receiver 80 includes an ICR 130, an ITLA (IntegrAble Tunable Laser Assembly) 140, and a control unit 150. The ICR 130 is an example of a converter. The ICR 130 is an integrated circuit in which a TIA 131 and a PD (Photodiode) 132 are stored in one package.

The main signal Sf2 transmitted from the optical transmitter 20 via the optical transmission path 50 is input to the PD 132. The PD 132 receives the main signal Sf2 by the local oscillation light (i.e., laser light) output from the ITLA 140, converts the main signal Sf2 into a current signal, and outputs the current signal to the TIA 131. The TIA 131 converts the current signal output from the PD 132 into a voltage signal, amplifies the voltage signal to an amplitude suitable for the ADC 120, and outputs the amplified voltage signal as an electrical data signal to the ADC 120. Thus, the ICR 130 receives the input main signal Sf2 and converts it into a data signal, by using the PD 132 and the TIA 131. The ADC 120 converts the data signal from analog format to digital format and outputs the converted digital signal to the RxDSP 110.

The RxDSP 110 receives the signal output from the ADC 120. The RxDSP 110 performs various digital signal processings. For example, the RxDSP 110 fixedly compensates for losses generated in the optical transmitter 20, the optical receiver 80 and the optical transmission path 50, for the data signal. Specifically, the RxDSP 110 performs wavelength dispersion compensation, skew compensation, band characteristic compensation and the like. The RxDSP 110 adaptively compensates for waveform distortion of the main signal Sf2 caused by polarization mode dispersion or polarization dependent loss generated on the optical transmission path 50, for the data signal.

Further, the RxDSP 110 performs digital demodulation processing (or demapping processing) on the signal in accordance with a baud rate and a modulation method (more specifically, multi-level modulation method) set by the control unit 150, thereby detecting a symbol from the signal and converting it into bit data, and demodulating an OTU (Optical Channel Transport Unit) frame from the data signal.

In addition, the RxDSP 110 extracts FEC (Forward Error Correction) from the OTU frame and performs data-error correction. The RxDSP 110 converts the OTU frame into a client signal and transmits the client signal to the client network. The client signal is, for example, an Ethernet (registered trademark) signal.

The control unit 150 includes a processor and a memory, and controls each operation of the RxDSP 110, the ICR 130 (concretely, the TIA 131), and the ITLA 140, as illustrated in FIG. 2. The processor includes, for example, a CPU (Central Processing Unit). The memory includes a volatile memory such as a RAM (Random Access Memory) and a non-volatile memory such as a ROM (Read Only Memory). The control unit 150 may be an FPGA (Field Programmable Gate Array) or an ASIC (Application Specific Integrated Circuit).

The control unit 150 performs various settings on the RxDSP 110 and the TIA 131 under the control of an operation terminal 25. The operation terminal 25 may be a PC (Personal Computer) or a smart terminal (such as a tablet terminal). As will be described in detail later, for example, when a signal type including a baud rate, a multi-level modulation method, a frame format, and the like is input from the operation terminal 25 to the control unit 150, the control unit 150 determines or calculates a peaking adjustment value according to the baud rate and sets the peaking adjustment value to the TIA 131.

Figure 3:
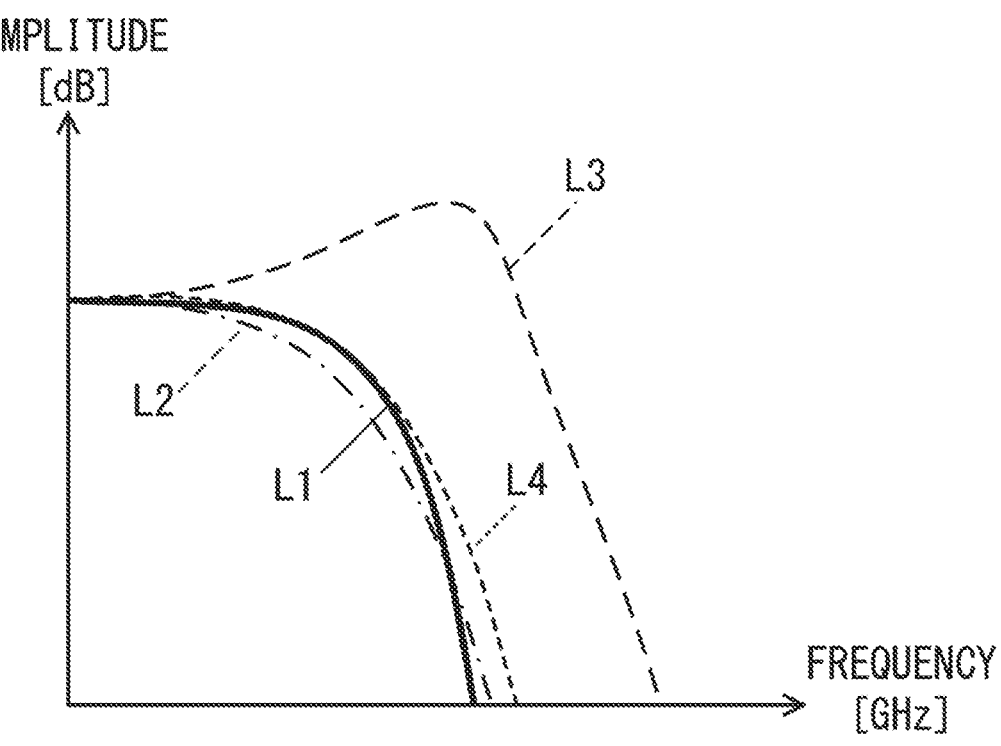
FIG. 3 is a diagram for explaining an example of band characteristic of the optical receiver.

The band characteristic of the optical receiver 80 will be described with reference to FIGS. 3, 4A and 4B. The following documents may be referred to as necessary.
(1) Laura ASCHEI et al., "A 42-GHz TIA in 28-nm CMOS With Less Than 1.8% THD for Optical Coherent Receivers", IEEE SOLID-STATE CIRCUITS LETTERS, Vol. 3, pp. 238-241, Jul. 29, 2020
(2) Japanese Laid-open Patent Publication No. 2013-090128

The band characteristic (specifically, frequency characteristic or gain characteristic) of the optical receiver 80 is expressed as a band characteristic obtained by combining the band characteristics of devices transmitting a data signal among various devices included in the optical receiver 80. In the present embodiment, as described above, the data signal passes through the ADC 120 and the ICR 130 as devices. On the other hand, the data signal does not transmit through the ITLA 140 as a device. Therefore, as illustrated in FIG. 3, the band characteristic L4 of the optical receiver 80 is expressed as a band characteristic obtained by combining a band characteristic L2 of the ADC 120 and a band characteristic L3 of the ICR 130.

Here, in order to prevent the shape of the band characteristic L1 of the main signal Sf2 from being distorted, it is desirable that the shape of the band characteristic L4 of the optical receiver 80 is slightly larger than the shape of the band characteristic L1 of the main signal Sf2 and the two shapes are close to each other. Thereby, as described above, the signal components A-H present in the region between the band characteristic L4 of the optical receiver 80 and the band characteristic L1 of the main signal Sf2 are reduced, and the deterioration of the signal quality of the main signal Sf2 is suppressed.

The TIA 131 included in the ICR 130 has a characteristic or function called peaking that amplifies an amplitude component in the band characteristic L3 of the ICR 130 and expands the band characteristic L3. In the present embodiment, such a characteristic or function is referred to as a peaking characteristic. Therefore, as illustrated in FIG. 3, even if the band characteristic L2 of the ADC 120 is insufficient (or insufficient) with respect to the band characteristic L1 of the main signal Sf2, the band characteristic L4 of the optical receiver 80 can be expanded by expanding the band characteristic L3 of the ICR 130 by utilizing the peaking characteristic.

Figure 4A:
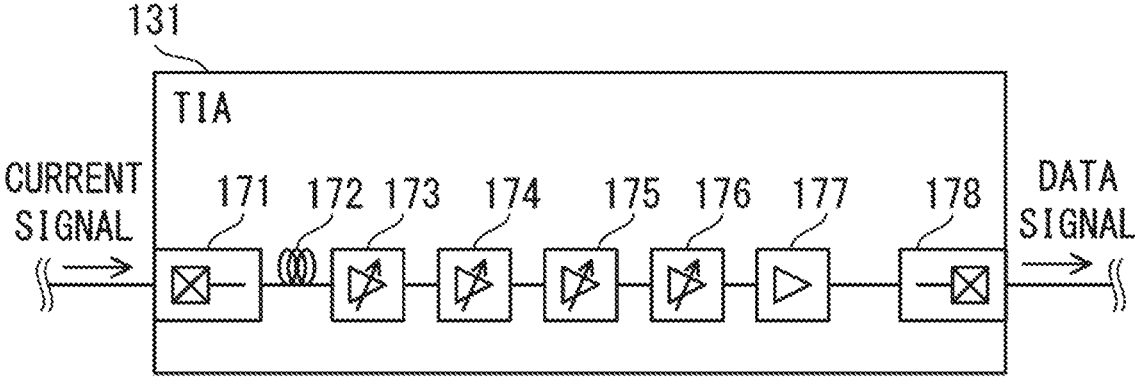
FIG. 4A is an example of a circuit diagram of a TIA (Transimpedance Amplifier)

As illustrated in FIG. 4A, the TIA 131 includes an input terminal 171, a reactance 172, an LNTA (Low-Noise Transient Amplifier) 173, a plurality of VGAs 174, 175 and 176, an output buffer 177, and an output terminal 178. Each of the input terminal 171 and the output terminal 178 includes a pad (specifically, high-frequency pad) and an ESD (Electro Static Discharge) protection circuit.

Each of the VGAs 174, 175 and 176 adjusts the gain based on the control voltage. The TIA 131 may include a DC offset removing circuit 179 that senses a DC (Direct Current) output voltage of the output buffer 177 and applies a correction current corresponding to the output voltage to the VGA 175.

The current signal which is output from the PD 132 and passes through the input terminal 171 and the reactance 172 in order is input to the LNTA 173. The LNTA 173 converts the current signal into a voltage signal and outputs the voltage signal to the VGA 174, 175 and 176 while reducing the contribution of noise to the VGA 174 due to an increase in gain. The VGA 174 amplifies the amplitude of the low frequency band (hereinafter referred to as low frequency component) of the voltage signal to an amplitude suitable for the ADC 120 by adjusting the gain based on the control voltage, and outputs the amplified voltage signal to the VGA 175.

The VGA 175 further amplifies the low-frequency component of the amplified voltage signal output from the VGA 174 by adjusting the gain based on the control voltage, and outputs the amplified voltage signal to the VGA 176. The VGA 176 further amplifies the low-frequency component of the amplified voltage signal output from the VGA 176 by adjusting the gain based on the control voltage, and outputs the amplified voltage signal to the output buffer 177. The output buffer 177 outputs the voltage signal as a data signal to the output terminal 178. The output terminal 178 outputs the data signal.

Figure 4B:
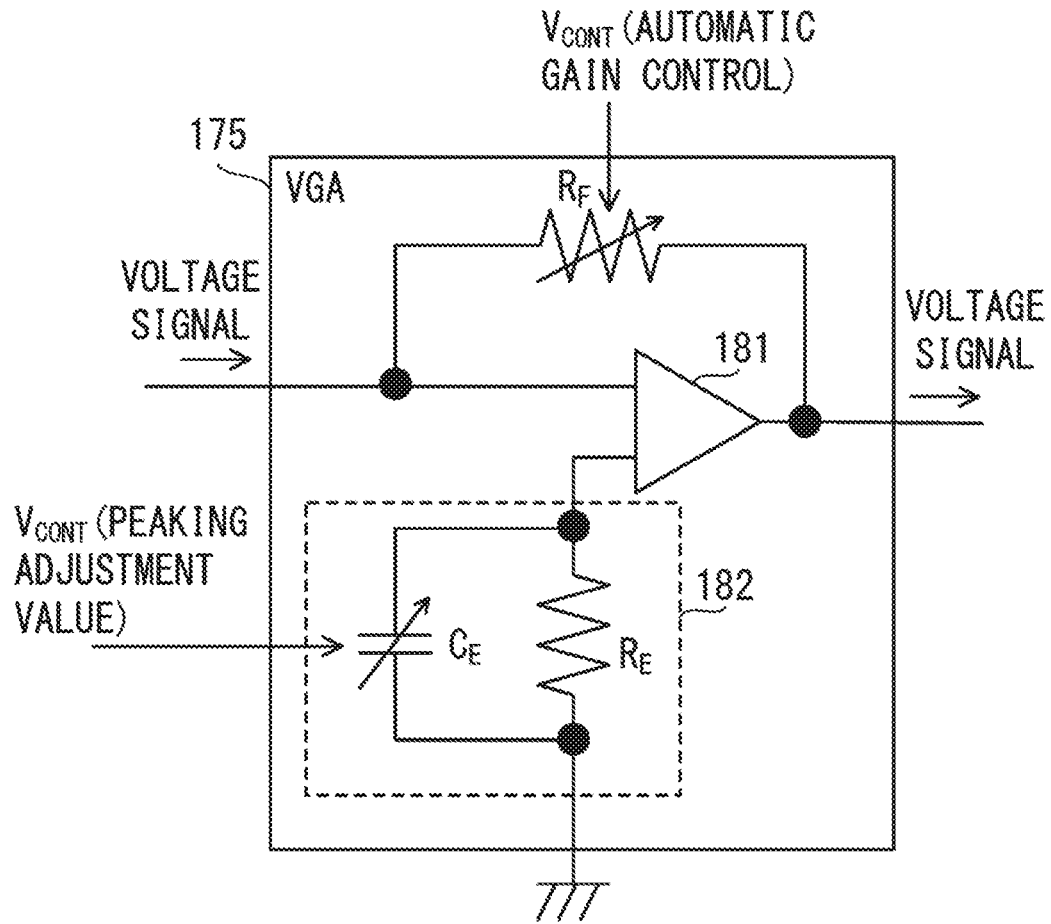
FIG. 4B is an example of a circuit diagram of a VGA (Variable Gain Amplifier)

Here, as illustrated in FIG. 4B, the VGA 175 includes an amplifier circuit 181 and a variable feedback resistor RF. The amplifier circuit 181 and the variable feedback resistor RF are connected in parallel. Input terminals of the amplifier circuit 181 and the variable feedback resistor RF are connected to the VGA 174. Output terminals of the amplifier circuit 181 and the variable feedback resistor RF are connected to the VGA 176.

By adjusting the value of a control voltage $V_{CONT}$ (automatic gain control) applied to the variable feedback resistor RF by the control unit 150, the resistance value of the variable feedback resistor RF is changed. When the resistance value of the variable feedback resistor RF changes, the gain of the amplifier circuit 181 changes. That is, the gain of the amplifier circuit 181 can be increased or decreased by adjusting the value of the control voltage $V_{CONT}$ (automatic gain control) applied to the variable feedback resistor RF by the control unit 150. In this way, the control unit 150 amplifies the amplitude of the low frequency component of the voltage signal.

The VGA 175 exhibits the peaking characteristic. More specifically, as illustrated in FIG. 4B, the VGA 175 includes a peaking circuit 182 for adjusting the peaking. The peaking circuit 182 includes an emitter series feedback resistor $R_E$ and a peaking capacitor $C_E$. The emitter series feedback resistor $R_E$ and the peaking capacitor $C_E$ are connected in parallel. One end of the emitter series feedback resistor $R_E$ is connected to the amplifier circuit 181. Although not illustrated, one end of the emitter series feedback resistor $R_E$ is connected to an emitter of a transistor included in the amplifier circuit 181. The other end of the emitter series feedback resistor $R_E$ is grounded. The peaking capacitor $C_E$ can be realized by using a variable capacitor such as an MIM (Metal-Insulator-Metal) capacitor, a MOS (Metal-Oxide-Semiconductor) capacitor, or a varactor capacitor. For example, by setting the peaking capacitor $C_E$ to the variable capacitor such as a varactor, the amount of peaking can be adjusted and the band of the amplifier circuit 181 can be improved.

By adjusting the value of the control voltage $V_{CONT}$ (peaking adjustment value) applied to the peaking capacitor $C_E$ by the control unit 150, the combined resistance value of the emitter series feedback resistor $R_E$ and the peaking capacitor $C_E$ changes. When the combined resistance value changes, the gain of the amplifier circuit 181 changes. That is, the gain of the amplifier circuit 181 can be increased or decreased by adjusting the value of the control voltage $V_{CONT}$ (peaking adjustment value) applied to the peaking capacitor $C_E$ by the control unit 150. Thus, the control unit 150 amplifies the amplitude of the high-frequency component of the voltage signal by the peaking characteristic.

Therefore, if the control unit 150 performs control to amplify the amplitude of the high-frequency component of the voltage signal, the band characteristic L3 of the ICR 130 can be expanded. Conversely, if the control unit 150 perform control to reduce the amplitude of the high-frequency component of the voltage signal, the band characteristic L3 of the ICR 130 can be reduced.

Therefore, if the baud rate of the main signal Sf2 and a constant (hereinafter referred to as a peaking adjustment value) corresponding to the value of the voltage are associated with each other in advance using a control table, a mathematical expression, or the like, the peaking adjustment value corresponding to the baud rate is determined or calculated. Thus, the value of the voltage corresponding to the peaking adjustment value is specified, and the band characteristic L3 of the ICR 130 is expanded or reduced.

Figure 5:
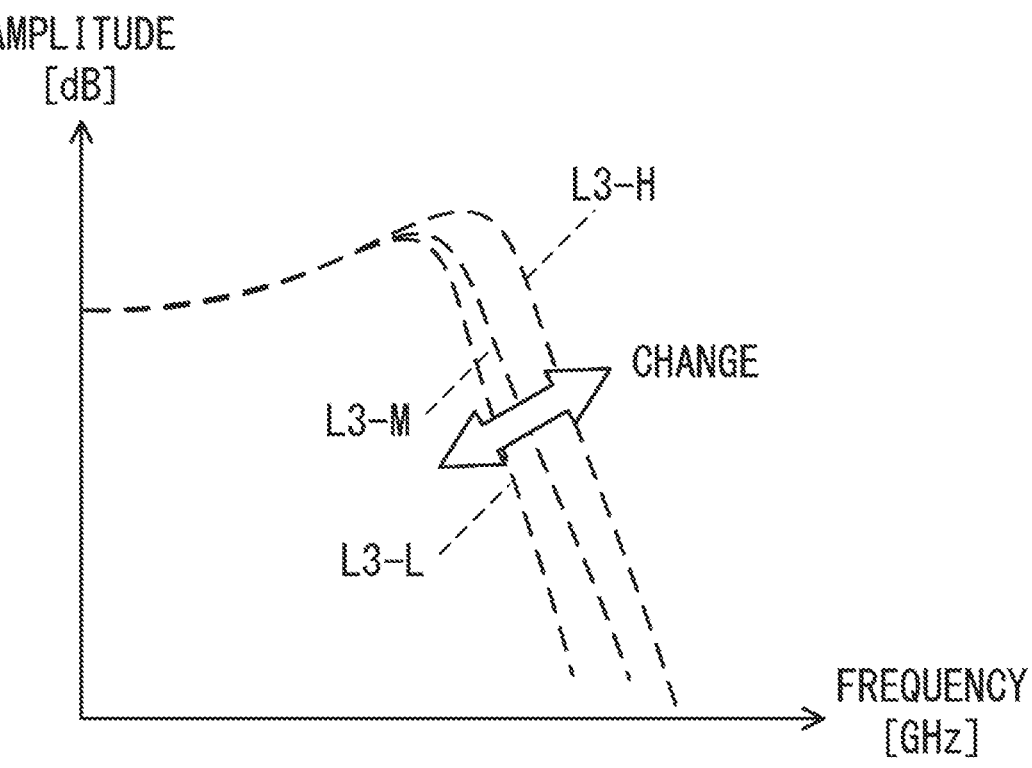
FIG. 5 is a diagram for explaining an example of a change in band characteristic of an ICR (Intense Coherent Receivers)

For example, as illustrated in FIG. 5, the TIA 131 can expand the band characteristic L3-M of the ICR 130 corresponding to the medium baud rate to the band characteristic L3-H of the ICR 130 corresponding to the high baud rate. Similarly, the TIA 131 can reduce the band characteristic L3-M of the ICR 130 corresponding to the medium baud rate to the band characteristic L3-L of the ICR 130 corresponding to the low baud rate. Therefore, when the band characteristic L2 of the ADC 120 and the band characteristic L3-H of the ICR 130 are combined, the band characteristic L4 of the optical receiver 80 is expanded. On the other hand, when the band characteristic L2 of the ADC 120 and the band characteristic L3-L of the ICR 130 are combined, the band characteristic L4 of the optical receiver 80 is reduced.

Figure 6:
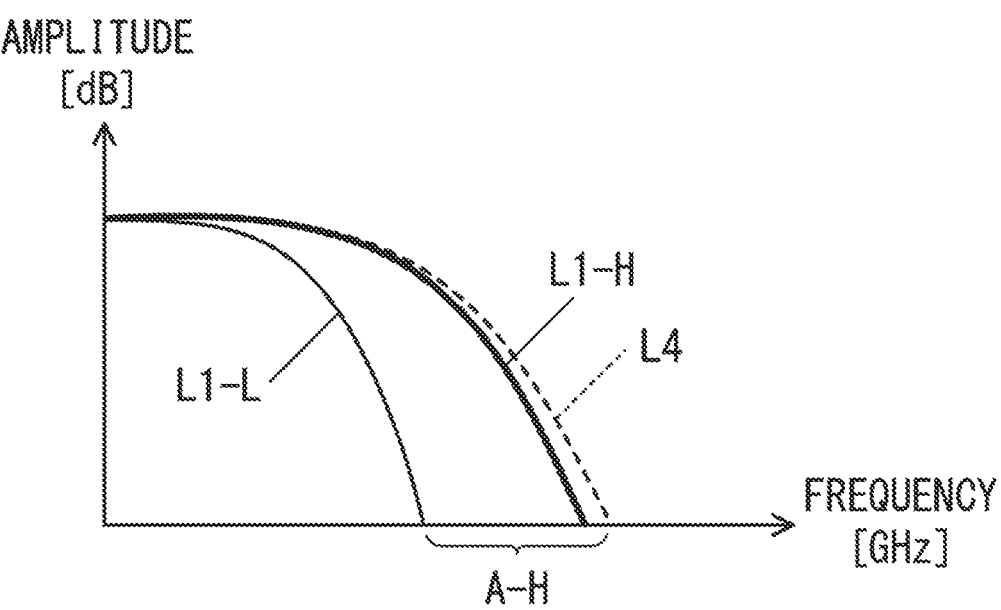
FIG. 6 is a diagram for explaining an example of a noise component superimposed on another adjacent main signal.

Therefore, when the band characteristic L1 of the main signal Sf2 is the band characteristic L1-H corresponding to the high baud rate as illustrated in FIG. 6, the band characteristic L4 of the optical receiver 80 approximates the shape of the band characteristic L1-H by utilizing the peaking characteristic. That is, the TIA 131 may determine the band characteristic L3-H (see FIG. 5) of the ICR 130 so that the band characteristic L4 of the optical receiver 80 approximates the shape of the band characteristic L1-H.

On the other hand, even if the band characteristic L1 of the main signal Sf2 is the band characteristic L1-L corresponding to the low baud rate, the band characteristic L4 of the optical receiver 80 approximates the shape of the band characteristic L1-L by utilizing the peaking characteristic. That is, the TIA 131 may determine the band characteristic L3-L (see FIG. 5) of the ICR 130 so that the band characteristic L4 of the optical receiver 80 approximates the shape of the band characteristic L1-L.

As illustrated in FIG. 6, when the band characteristic L1 of the main signal Sf2 is the band characteristic L1-L corresponding to the low baud rate, the bandwidth of the frequency becomes narrower than that of the band characteristic L1-H. If the band characteristic L4 approximating the shape of the band characteristic L1-H is fixedly set, the band characteristic L4 becomes excessively wide with respect to the band characteristic L1-L. As a result, a region in which a signal component of another main signal Sf3 adjacent to the main signal Sf2 exists appears between the band characteristic L4 and the band characteristic L1-L. In such a case, since this signal component lowers the amplification factor of the TIA 131, the signal quality of the main signal Sf2 may be deteriorated.

However, as described above, in the present embodiment, even if the band characteristic L1 of the main signal Sf2 is the band characteristic L1-L corresponding to the low baud rate, the band characteristic L4 of the optical receiver 80 approximates the shape of the band characteristic L1-L by utilizing the peaking characteristic. Thereby, the region where the signal component of the main signal Sf3 exists does not appear, or this region becomes very small. As a result, in the transmission of the WDM signal, it is possible to suppress the deterioration of the signal quality of the main signal Sf2 caused by the signal component of the main signal Sf3 and to avoid the deterioration of the transmission performance in the optical transmission system ST.

As the low baud rate in the present embodiment, for example, 60 Gbaud or 64 Gbaud can be adopted. As the medium baud rate in this embodiment, for example, 90 Gbaud or 96 Gbaud can be adopted. As the high baud rate in this embodiment, for example, 120 Gbaud or 130 Gbaud can be adopted.

Next, the operation of the control unit 150 according to the first embodiment will be described with reference to FIGS. 7 and 8.

Figure 7:
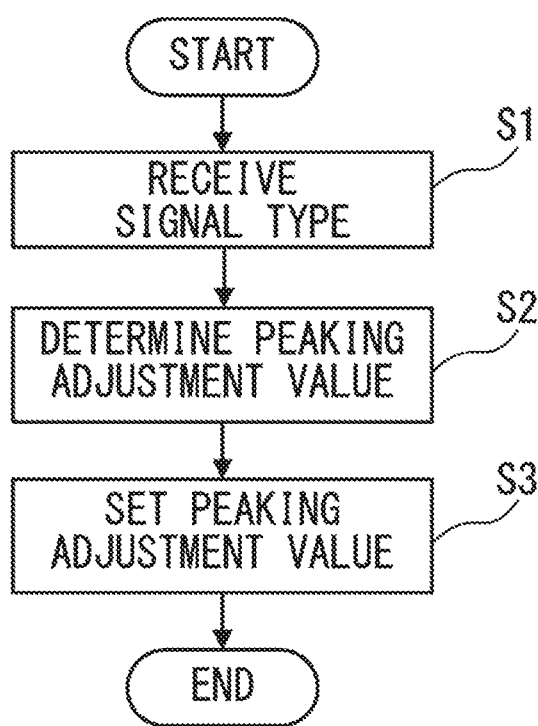
FIG. 7 is a flowchart illustrating an example of operation of a control unit according to a first embodiment.

First, as illustrated in FIG. 7, the control unit 150 receives a signal type input from the operation terminal 25 (step S1). As described above, the signal type includes the baud rate, the modulation method, the frame format, and the like of the main signal Sf2. The control unit 150 receives the signal type as the setting of the main signal Sf2.

Figure 8A:
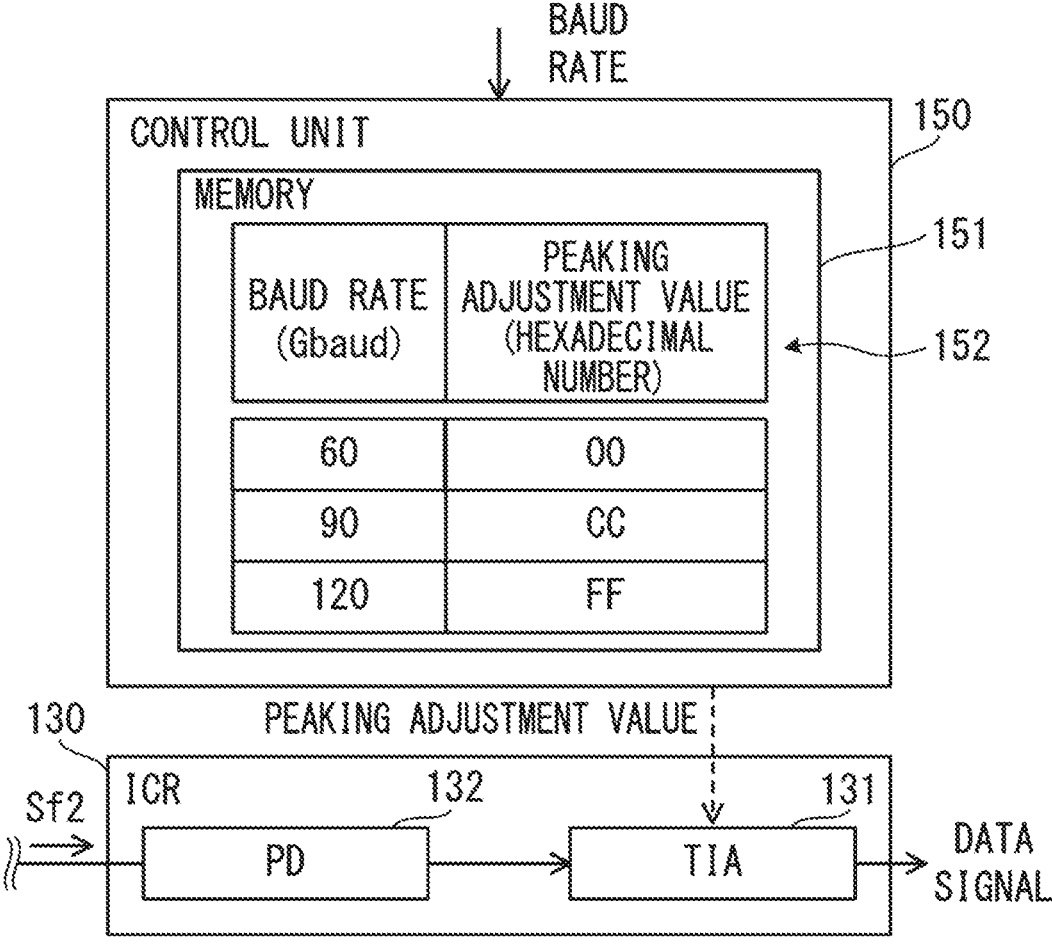
FIG. 8A is a diagram for explaining an example of a control table.

When the signal type is received, the control unit 150 determines the peaking adjustment value (step S2). Here, as illustrated in FIG. 8A, the control unit 150 includes a memory 151, and the memory 151 stores a control table 152. In the control table 152, a correspondence relationship between the baud rate and the peaking adjustment value is defined. Therefore, when the control unit 150 receives the signal type, the control unit 150 can determine the peaking adjustment value corresponding to the baud rate included in the signal type. In the control table 152, the peaking adjustment value decreases as the baud rate decreases. That is, in the control table 152, a smaller peaking adjustment value is registered as the baud rate is smaller. Further, although the peaking adjustment value according to the first embodiment is illustrated in hexadecimal number, it may be other than hexadecimal number.

When the peaking adjustment value is determined, the control unit 150 sets the peaking adjustment value to the TIA 131 (step S3) and ends the process. Thus, the value of the control voltage $V_{CONT}$ (peaking adjustment value) corresponding to the peaking adjustment value is applied to the peaking capacitor $C_E$ (see FIG. 4B), and the band characteristic L3 of the ICR 130 changes.

Figure 8B:
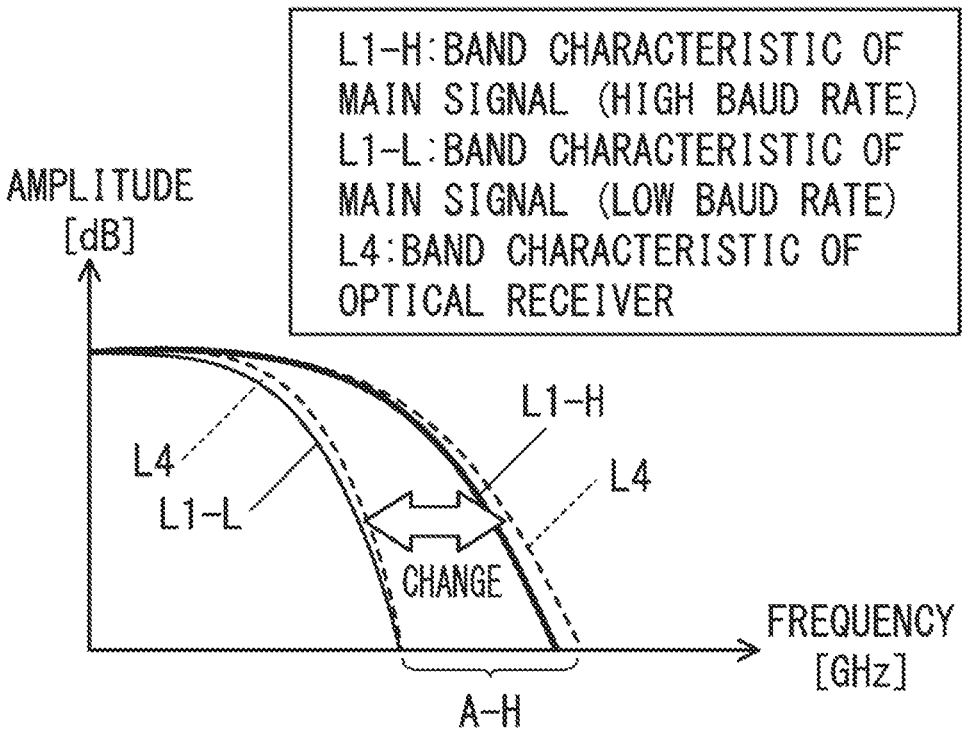
FIG. 8B is a diagram for explaining an example of a change in the band characteristic of an optical transmitter.

Therefore, for example, if the high baud rate is included in the signal type, the shape of the band characteristic L4 of the optical receiver 80 approximates the shape of the band characteristic L1-H of the main signal Sf2 of the high baud rate, as illustrated in FIG. 8B. If the low baud rate is included in the signal type, the shape of the band characteristic L4 of the optical receiver 80 approximates the shape of the band characteristic L1-L of the main signal Sf2 of the low baud rate, as illustrated in FIG. 8B. Thus, according to the optical receiver 80 according to the first embodiment, the band characteristic L4 corresponding to the baud rate of the main signal Sf2 can be ensured.

Second Embodiment

Next, the operation of the control unit 150 according to the second embodiment will be described with reference to FIGS. 9 and 10.

Figure 9:
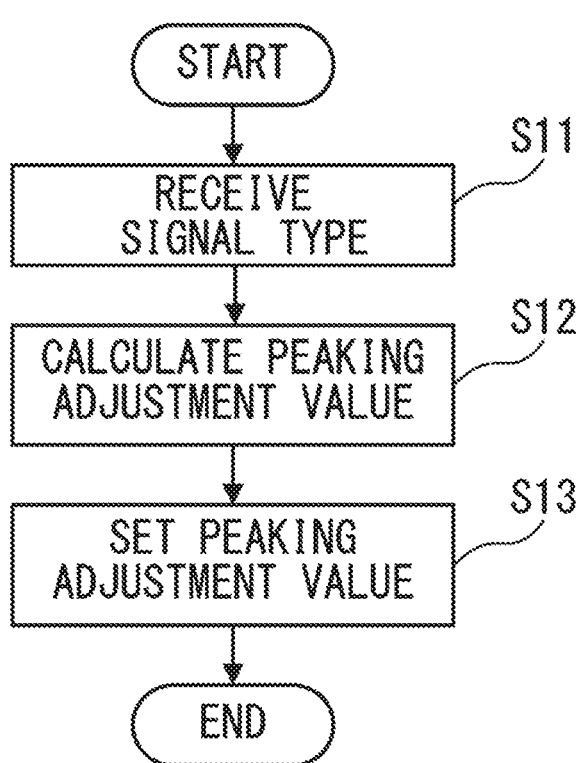
FIG. 9 is a flowchart illustrating an example of operation of the control unit according to a second embodiment.
Figure 10:
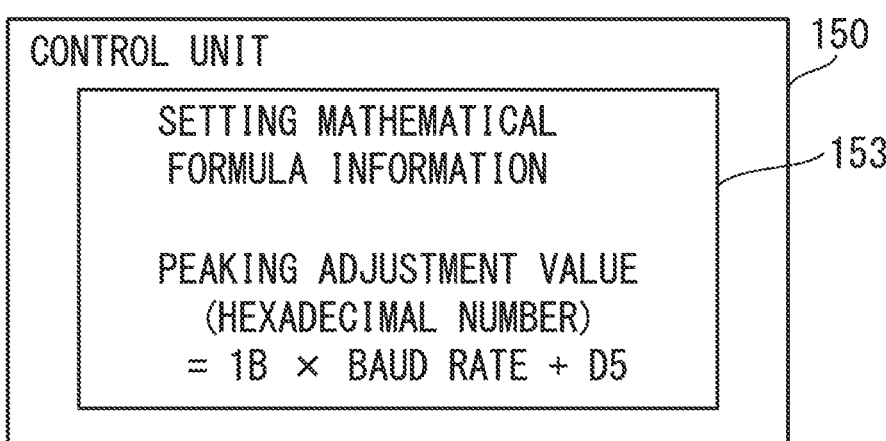
FIG. 10 is a diagram for explaining an example of mathematical expression information.

First, as illustrated in FIG. 9, the control unit 150 receives the signal type output from the operation terminal 25 (step S11). Since the process of step S11 is basically the same as that of step S1, a detailed description thereof is omitted.

When the signal type is received, the control unit 150 calculates the peaking adjustment value (step S12). Here, as illustrated in FIG. 10, the control unit 150 stores setting mathematical formula information 153. That is, mathematical formula information is set in advance in the control unit 150. The mathematical formula information is information including "a peaking adjustment value (hexadecimal number)=1B (hexadecimal number)×baud rate+D5 (hexadecimal number)". Constants such as 1B (hexadecimal number) and D5 (hexadecimal number) can be appropriately determined according to design, experiment, or the like.

As described above, the correspondence relationship between the baud rate and the peaking adjustment value is defined in the control 150. Therefore, when the control unit 150 receives the signal type, the control unit 150 can calculate the peaking adjustment value corresponding to the baud rate included in the signal type. According to the mathematical formula information, the peaking adjustment value decreases as the baud rate decreases. That is, in the mathematical formula information, the smaller the baud rate is, the smaller the peaking adjustment value is calculated. Further, although the peaking adjustment value according to the second embodiment is illustrated in hexadecimal number, it may be other than hexadecimal number.

When the peaking adjustment value is calculated, the control unit 150 sets the peaking adjustment value to the TIA 131 (step S13) and ends the process. Thus, the value of the control voltage $V_{CONT}$ (peaking adjustment value) corresponding to the peaking adjustment value is applied to the peaking capacitor $C_E$ (see FIG. 4B), and the band characteristic L3 of the ICR 130 changes.

Therefore, for example, if the high baud rate is included in the signal type, the shape of the band characteristic L4 of the optical receiver 80 approximates the shape of the band characteristic L1-H of the main signal Sf2 of the high baud rate. If the low baud rate is included in the signal type, the shape of the band characteristic L4 of the optical receiver 80 approximates the shape of the band characteristic L1-L of the main signal Sf2 of the low baud rate. As described above, even in the optical receiver 80 according to the second embodiment, the band characteristic L4 corresponding to the baud rate of the main signal Sf2 can be ensured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical receiver comprising:
   a converter that converts an optical signal into an electrical data signal;
   a controller that changes an adjustment value of peaking based on a baud rate of the optical signal; and
   an amplifier that changes a band characteristic of the converter based on the adjustment value changed by the controller.

2. The optical receiver according to claim 1, wherein the peaking is a characteristic that amplifies an amplitude component in the band characteristic of the converter.

3. The optical receiver according to claim 1, wherein the amplifier adjusts the peaking based on the adjustment value to change the band characteristic of the converter.

4. The optical receiver according to claim 1, wherein the controller includes a memory that stores a table defining a correspondence relationship between the baud rate and the adjustment value, and determines the adjustment value according to the baud rate based on the table.

5. The optical receiver according to claim 4, wherein the correspondence relationship is a relationship in which the adjustment value decreases in response to a decrease in the baud rate.

6. The optical receiver according to claim 1, wherein the controller stores mathematical formula information defining the correspondence relationship between the baud rate and the adjustment value, and calculates the adjustment value according to the baud rate based on the mathematical formula information.

7. The optical receiver according to claim 6, wherein the correspondence relationship is a relationship in which the adjustment value decreases in response to a decrease in the baud rate.

* * * * *